United States Patent

Takeuchi

[11] Patent Number: 4,709,985
[45] Date of Patent: Dec. 1, 1987

[54] FLEXIBLE OPTICAL FIBERS FOR USE IN VIEWING DEVICES

[75] Inventor: Toshio Takeuchi, Tokyo, Japan

[73] Assignee: Toyo Menka Kaisha, Ltd., Tokyo, Japan

[21] Appl. No.: 646,521

[22] Filed: Sep. 4, 1984

[30] Foreign Application Priority Data

Sep. 27, 1983 [JP] Japan .................. 58-176983

[51] Int. Cl.$^4$ .................................................. G02B 6/06
[52] U.S. Cl. .................................................. 350/96.25
[58] Field of Search ............... 350/96.24, 96.25, 96.26, 350/538, 540, 618, 622, 96.23

[56] References Cited

U.S. PATENT DOCUMENTS

| | | | |
|---|---|---|---|
| 2,359,706 | 10/1944 | Orlowsky | 350/622 |
| 3,050,907 | 8/1962 | Hicks, Jr. et al. | 350/96.26 |
| 3,127,191 | 3/1964 | Goldman | 350/622 |
| 3,190,735 | 6/1965 | Kapany | 350/96.24 |
| 3,272,174 | 9/1966 | Pribonic | 350/96.24 |
| 3,394,978 | 7/1968 | Muller | 350/622 |
| 3,520,587 | 7/1970 | Tasaki et al. | 350/96.26 |
| 3,967,289 | 6/1976 | Yevick | 350/96.24 X |
| 3,977,855 | 8/1976 | Cole | 350/96.25 X |
| 4,000,419 | 12/1976 | Crost et al. | 350/96.25 X |
| 4,057,338 | 11/1977 | Yevick | 350/96.24 |
| 4,099,833 | 7/1978 | Tosswill | 350/96.25 |
| 4,101,188 | 7/1978 | Yevick | 350/96.24 |
| 4,170,400 | 10/1979 | Bach et al. | 350/96.25 |
| 4,514,036 | 4/1985 | McDonald | 350/96.23 |

FOREIGN PATENT DOCUMENTS

| | | | |
|---|---|---|---|
| 1922924 | 11/1970 | Fed. Rep. of Germany | 350/538 |
| 2014696 | 10/1971 | Fed. Rep. of Germany | 350/618 |
| 606255 | 6/1926 | France | 350/622 |
| 778723 | 1/1935 | France | 350/540 |
| 2425959 | 1/1980 | France | 350/618 |
| 365293 | 12/1962 | Switzerland | 350/622 |

*Primary Examiner*—James W. Davie
*Assistant Examiner*—Frank González
*Attorney, Agent, or Firm*—Edmund M. Jaskiewicz

[57] ABSTRACT

A twisted flexible optical fiber bundle adapted to be used in viewing devices for transportation vehicles such as automobiles, the twisted fiber bundle being prepared by twisting each of flexible optical fiber gatherings by 180° prior to longitudinally laminating the thus twisted optical fiber gatherings, thereby forming a right side-left side inverted image when used in viewing devices; and viewing devices in which the twisted flexible optical fiber bundle is used as the image transmitting means.

11 Claims, 11 Drawing Figures

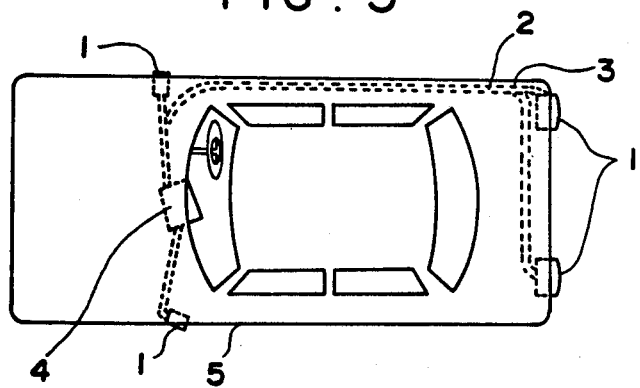
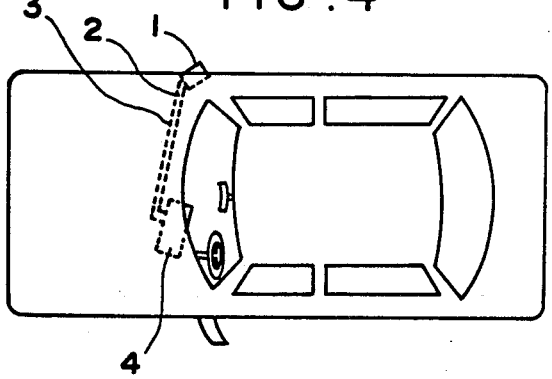
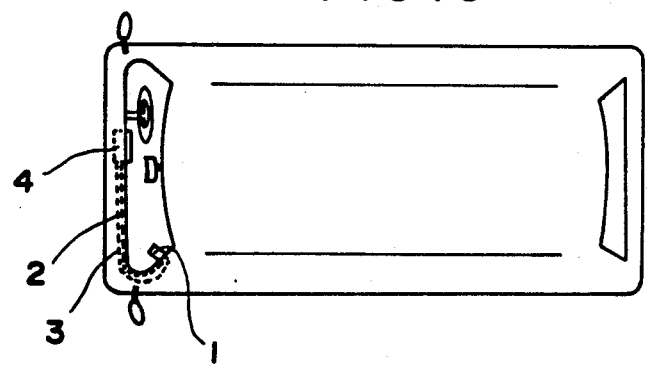

FLEXIBLE OPTICAL FIBERS FOR USE IN VIEWING DEVICES

BACKGROUND OF THE INVENTION

1. Field of the Invention

This invention relates to flexible optical fibers, particularly those in the form of a twisted flexible optical fiber bundle, for use in a viewing device for observing the image of areas outside the field of view of an observer, comprising at least one object lens fixed to observe areas outside the field of view of an observer, an image forming unit, such as a display, installed in front of the observer, and flexible optical fibers connected at one end to the at least one object lens and at the other end to the image forming unit, thereby to transmit an image received by the object lens through the flexible optical fibers to the image-forming unit where the image is formed. This invention further relates to a viewing device in which such a specific bundle of flexible optical fibers is used.

2. Description of the Prior Art

Vehicles, for example, automobiles have heretofore been provided with devices for viewing outward scenes, such as a room rearview mirror and side view mirrors used in combination, however, these viewing devices have many defects derived from their design and structure. Even if the room rearview mirror and side view mirrors are used in combination, the most serious defect found in this case is to produce dead spaces or dead angles, for example, just behind the automobile. In the case of large-sized cars, such dead spaces are produced even at outer sides of the car. Further, it is necessary for the driver to shift his sight from up to down and from left to right in order to confirm safety at the sides or rear side of the automobile while it is driven. This is an important problem from the view-point of safety.

In addition, as to a room rearview mirror in an automobile, there are raised problems that a small mirror provides a small view of the rearward scene, while too large a mirror hinders the forward field of view. Further, such too large a mirror tend to allow the driver and fellow passengers to hazardously hit their head against the mirror when the automobile causes an accident such as collision or sudden stop and also tend to limit their movement in the room of the automobile. Still further, there is raised a problem that the rearward field of view is hindered due to the rear window being clouded when it is heavily snowing or raining.

On the other hand, as to the side view mirrors fixed on the outer walls of the automobile, there are raised problems that the side view mirrors are very liable to injure the driver and pedestrians since they are not only protruded from the roof and side walls of the automobile, but also liable to scrape roadside trees. Further, it raises problems as to safety that at night such side view mirrors reflecting lights from rearward vehicles have a blinding effect and allow snow to be attached thereto on a snowy day. Furthermore, side view mirrors are, per se, so limited in their position to be installed and shape to be taken that they may easily provide a side view of the outward scene, whereby they are made commonplace in style and are disadvantageous in that they produce comparatively great air resistance when the automobile runs.

In view of the defects of the conventional rearview mirrors, particularly the safety thereof, many attempts have been made to provide improved rearview devices as exemplified below.

The improved rearview devices proposed include a rearview device (Japanese published Utility Model Application No. 51-30752) comprising three plane mirrors combined together in a housing fixed on the automobile body portion just above the windshield of an automobile, a rearview device (Japanese published patent application No. 56-6891) which enables even a smaller mirror to provide a certain wide angle field of view under certain conditions by refracting incident rays of light in the direction of normal line thereby shortening the path of the light by the use of prisms placed in a housing fixed on the same body portion as above, and a rearview device using a television camera.

However, with said rearview device comprising the three mirrors, it will be difficult for any driver to obtain a constant field of view because of the structure of the combined mirrors in cases where they are small in size, and it will take a time for a remarkably tall-bodied or short-bodied driver to adjust the mirrors. On the other hand, in cases where such mirrors are large in size, there will be raised many problems as to their fixing, appearance and the like. Said rearview device comprising the prisms eliminates the aforesaid defects, however, it still produces dead angles (or dead spaces) rearward and downward of the vehicle body, the dead angles becoming a problem particularly when the vehicle is backed. These proposed rearview devices do not eliminate the drawbacks of the conventional rearview mirrors, but only solve a part of the above problems. Further, said rearview device using a television camera is disadvantageous in that the camera portion is difficult to produce in the miniaturized form and the outward protrusions thereof are consequently remarkable. Still further, the weakest points of the device using a television camera are that since the camera and the like comprise many electronic components, they are vulnerable to vibration thereby raising a problem as to their durability and they will stop their operation due to a power failure.

SUMMARY OF THE INVENTION

An object of this invention is to provide flexible optical fibers, particularly those in the twisted bundle form, for use in a viewing device, mounted on a vehicle, for viewing the outward scene which is not directly visible to the driver of the vehicle.

Another object is to provide a viewing device in which such optical fibers are used, the viewing device eliminating the production of dead angles, improving safety and exhibiting less air resistance when the vehicle runs, and permitting the appearance of the vehicle to be optionally designed. The device so provided is one which is improved in consideration of the previously mentioned problems as to the conventional techniques regarding rearview and side view devices.

The flexible optical fibers are used as an image transmitting means in the viewing device.

The viewing device comprises at least one object lens installed on the outer side of the body of a transportation vehicle such as an automobile, an image-forming unit installed in front of the steering seat of the vehicle, and flexible optical fibers which are connected at one end to the object lens and at the other end to the image forming unit, the flexible optical fibers being useful in transmitting an image of the outward scene received by the object lens to the display where the image is reproduced or formed.

The flexible optical fibers used herein are not particularly limited in sectional shape. They are preferably circular in section and may be polygonal in section depending on the purpose for which they are used.

It is preferable particularly for the viewing devices for transportation vehicles that the flexible optical fibers be in the form of a bundle prepared by arranging flexible optical fibers in parallel to one another to form gatherings of flexible optical fibers (hereinafter referred to as "flexible optical fiber gatherings"), twisting each of the flexible optical fiber gatherings by an angle of 180 degrees and then laminating the thus twisted flexible optical fiber gatherings together to obtain a bundle of the twisted flexible optical fiber gatherings (the bundle being hereinafter referred to as "twisted flexible optical fiber bundle").

In general, when the driver of a transportation vehicle views the rearward scene by means of side view mirrors, rearview mirrors, door mirrors and the like, the image of the rearward scene reflected from the mirrors will be an inverted one in which the right and left sides are inverted with respect to each other; on the other hand, in the viewing device using conventional (non-twisted) flexible optical fibers connected at one end to the object lens and at the other end to the image forming unit (display for example) as the image-transmitting medium, the image the driver sees is the same as the view he will see when he looks back. Accordingly, this image is inverted with respect to the image the driver sees by means of rearview mirror and it will therefore give a drive feeling different from the usual one, this being confusing for the driver, who is accustomed to usual drive using rearview mirrors to see the rearward scene, to drive a car.

The inversion may also be effected by the use of flat mirrors, prisms and flexible optical fibers (twisted or not) in suitable combination.

It should be noted, however, that the image inversion is usually unnecessary in cases where the observer watches the forward scene which is beyond obstructions.

As one of means for inverting images, the present inventor contrived a device using prisms for viewing outside scenes as in Example 8 to be described later. However, such a device is advantageous in that it can be made in the compact form in appearance with the attendant economy of materials therefor, whereas it is disadvantageous in that it requires a large number of parts because of its structure and is still not satisfactorily inexpensive.

It is thus preferable that the flexible optical fibers to be used in this invention be in the form of a 180° twisted flexible optical fiber bundle which will transmit an image inputted to one end of the fiber bundle, to the other end thereof where the image is outputted to be an inverted image. By the use of the twisted flexible optical fiber bundle in a viewing device comprising an image forming means such as a display, there may be provided an inverted image which is customary for vehicle drivers.

BRIEF DESCRIPTION OF THE DRAWINGS

This invention will be better understood by the following examples and a reference example with reference to the accompanying drawings in which

FIG. 3 is a diagrammatic plan view of the passenger car of FIG. 2;

FIG. 4 is a diagrammatic plan view of a lefthand drive car fitted with a viewing device embodying this invention;

FIG. 5 is a diagrammatic view of a one-box car fitted with a viewing device embodying this invention;

DESCRIPTION OF THE PREFERRED EMBODIMENTS

Example 1

Figure 1:
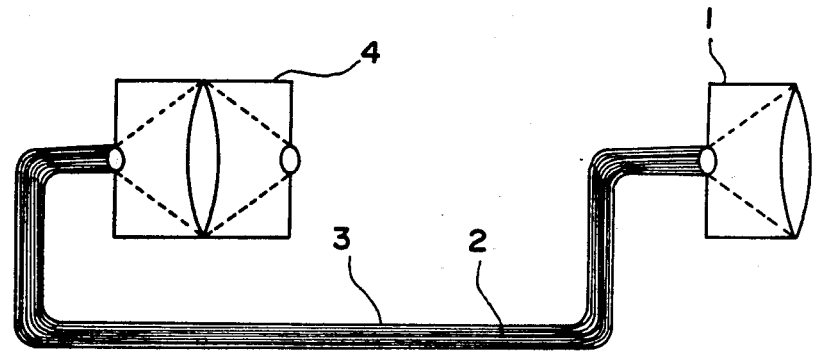
FIG. 1 is a diagrammatic view of an embodiment of a viewing device of this invention.

Referring now to FIG. 1, an object lens 1 is fixed on the outside of the body of a transportation vehicle. The object lens 1 may be one made of optical glass, a synthetic resin or the like. The image of a scene outside of the vehicle, which is received by the object lens 1, is transmitted through flexible optical fibers 2 to a display 4 where it is optically formed or reproduced. The flexible optical fibers 2 are protected by a flexible tube 3 and may be fixed in the inside or outside of the body of a transportation vehicle. They are not particularly limited in length, diameter and number used and they may be only such that the image of a scene outside of the transportation vehicle is effectively transmitted to a display 4 positioned in front of the vehicle driver. The display 4 houses a convex lens which finally forms the image of the scene outside of the vehicle. It is preferable that the display 4 be positioned at such a site that the driver easily sees it and the driver and fellow passengers are substantially not imperiled thereby when the vehicle collides and suddenly stops. In addition, according to this invention, a prism or flat mirror having a known function such as image inversion or adjustment of length of light path, may be installed in the light path between the lens 1 and optical fibers 2 and/or in the light path within the display 4 if desired. Thus, the image inversion may be attained.

Example 2

Figure 2:
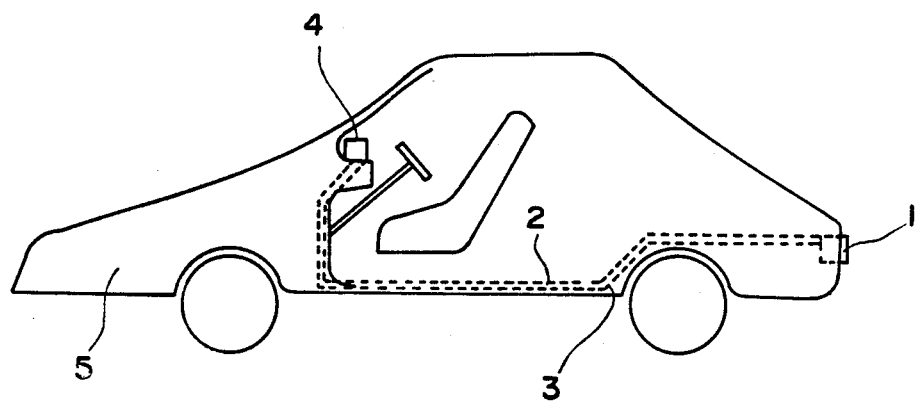
FIG. 2 is a diagrammatic side view of a passenger car fitted with a viewing device embodying this invention.

In FIGS. 2 and 3, object lenses 1 are each fixed symmetrically on the left and right outer sides of the rear part of a vehicle body 5 and also symmetrically on the left and right outer sides of the forward part thereof in order to eliminate dead angles which might otherwise be produced in the places just rearwardly and laterally of the vehicle body. An image received by each of the lenses 1 fixed on said four sites is transmitted through the flexible optical fibers 2 to a display 4 where the image is optically formed.

Example 3

FIG. 4 illustrates a lefthand drive car fitted therein with a left door mirror and rearview mirror and additionally with a viewing device of this invention thereby to allow no dead angles to be produced in the spaces on the right and rear sides of the car. Such dead angles are the most serious ones for a lefthand drive car fitted with door mirrors. In the above case, the viewing device of this invention is used in combination with the left door mirror and rearview mirror.

Example 4

FIG. 5 illustrates a righthand drive one-box car fitted with side view mirrors and a rearview mirror and additionally with a viewing device of this invention in the front of the car thereby to eliminate dead angles in the space ahead of the car. In this case, the viewing device of this invention is used in combination with the rearview mirror.

The effects or advantages obtained by the practice of this invention are as follows.

(1) A driver at his driving seat of a vehicle can see the images of sideward and rearward scenes outside of the vehicle without dead angles produced in the scenes by an image-forming unit such as a display positioned in front of the driver. Thus, it is unnecessary for the driver to look aside while driving the car and look back while backing it up, this contributing to the enhancement of safety;

(2) Dangers which may be caused in the room of a vehicle at the time of collision or sudden stop thereof, may be avoided. In addition, the use of the viewing device of this invention will render it possible to make a wider and freer use of the room space of the vehicle;

(3) It is possible to cover a satisfactorily wide field of view even on snowy or rainy days and to prevent blinding effects at night by the adjustment of the display;

(4) There may be avoided injuries to a driver of a vehicle and pedestrians by side view mirrors protruded outside of the vehicle as well as contact of the mirrors with roadside trees or the like;

(5) The use of the viewing device of this invention will allow a vehicle to be designed as desired and will render it possible to produce a vehicle having reduced air resistance; and (6) The viewing device of this invention is superior in durability to television cameras or the like because of its mechanical structure.

The viewing device of this invention having the above effects or advantages are used alone or in combination with the conventional rearview mirror and the like as a viewing device in substitution for a room rearview mirror and side view mirrors.

Further, the viewing devices of this invention may be used not only for vehicles, particularly passenger cars, but also for other vehicles, for example autobicycles, as a substitute for their side view mirrors (or handle mirrors) and rearview mirror. Still further, they may be used for observing outward scenes from the inside of an armoured vehicle and also for vessels such as motor boats, aircrafts such as a single-seat or two-seat small-sized plane or a medium-sized or large-sized plane, crane installations, transportation apparatuses such as a remote-operated conveyor, and underground shelters.

Example 5

Figure 6:
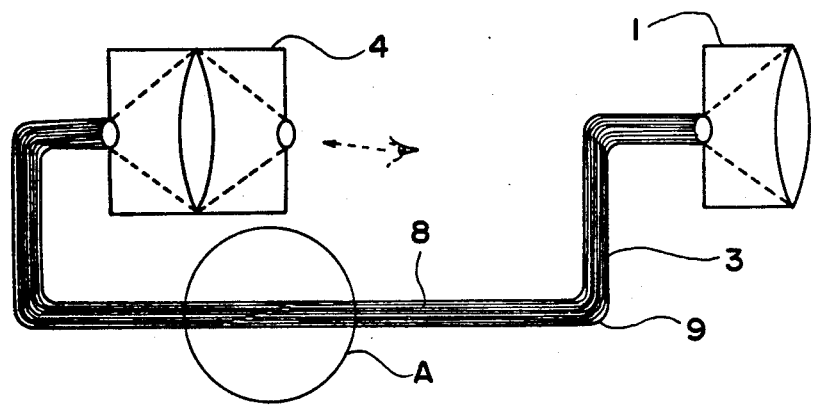
FIG. 6 illustrates the same viewing device as FIG. 1, which indicates a portion "A" wherein the flexible optical fiber bundle has been 180° twisted for image inversion.
Figure 7A:
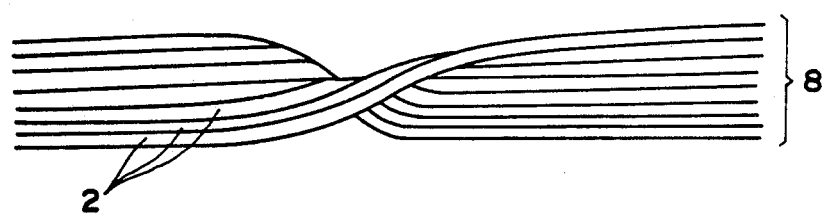
FIG. 7a illustrates a flexible optical fiber gathering prepared by arranging flexible optical fibers is parallel with one another.
Figure 7B:
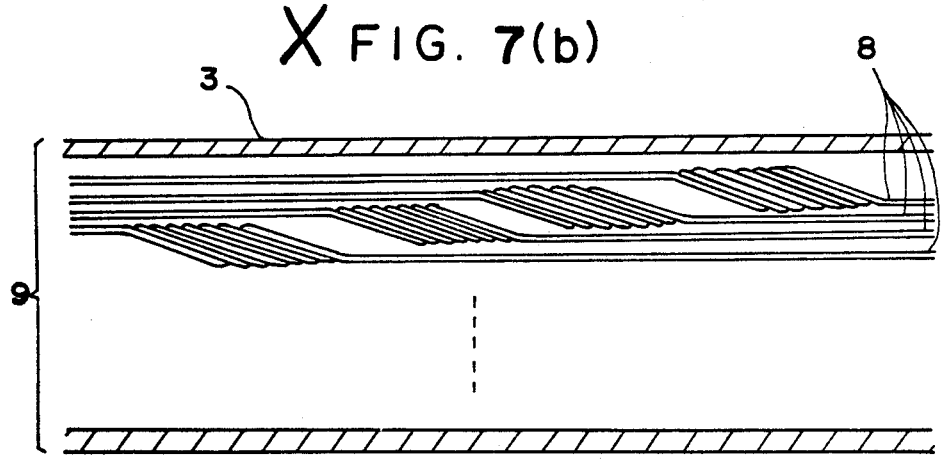
FIG. 7b illustrates a flexible optical fiber bundle prepared by longitudinally laminating the flexible optical fiber gatherings together.

FIG. 6 illustrates a viewing device of this invention, which uses therein a flexible optical fiber bundle 9. FIG. 7(a) is an enlarged view of a portion "A" of the optical fiber bundle 9 of FIG. 6 and FIG. 7(b) is an enlarged view of a twisted flexible optical fiber gathering 8.

In FIG. 6, an object lens 1 is fixed in at least one site of the outside of the body of a transportation vehicle to be fitted with the viewing device. An image of a scene outside of the transportation vehicle is received by the object lens 1, transmitted through the optical fiber bundle 9 to the portion A where the image is inverted, and then further transmitted to a display 4 where the inverted image is formed. The flexible optical fiber bundle 9 in FIG. 7(b) is prepared by arranging flexible optical fibers 2 in parallel with one another to form flexible optical fiber gatherings 8 in FIG. 7(a), twisting each of the thus formed optical fiber gatherings 8 by 180° and then laminating the thus twisted flexible optical fiber gatherings to obtain a twisted flexible optical fiber bundle together. If a bundle consisting of of non-twisted flexible optical fiber gatherings is twisted by 180°, the thus twisted bundle will only result in the formation of an "upside-down" image, not an inverted (right side-left side inverted) image, when used in the viewing device of this invention. The flexible optical fiber bundle 9 may be prepared efficiently and in the compact form by laminating the twisted flexible optical fiber gatherings 8 together in such a manner that the twisted portion of one optical fiber gathering does not engage with that of another optical fiber gathering.

The number, length, diameter and the like of flexible optical fibers 2 in the flexible optical fiber bundle 9 are not particularly limited as far as the optical fibers 2 are such that, depending on the purpose, they can transmit the image of a scene outside of a transportation vehicle effectively from an image receiving lens to a display 4 in the vehicle. It is preferable that the diameter of the optical fibers 2 be in the range of from 0.1 to 0.5 mm. The display 4 in which a convex lens for example is housed, will finally form images. It is desirable that the display 4 be set up in such a site (in front of the driver's seat, for instance) that it can be easily seen and will little endanger the driver and fellow passengers in a car even if it collides or suddenly stops. The display 4 used herein may be any means by which an image is visibly formed. For example, such a means may be such that an image appearing at the end of the flexible optical fiber bundle 9 is directly viewed.

The number of flexible optical fibers which the flexible optical fiber gathering is composed of, is not particularly limited, but it is in the range of preferably 80–160 from the view-point of resolving power and flexibility of the resulting gathering. The number of flexible optical fiber gatherings which the flexible optical fiber bundle is composed of, is neither particularly limited, but it is in the range of preferably 80–160.

Example 6

Figure 8:
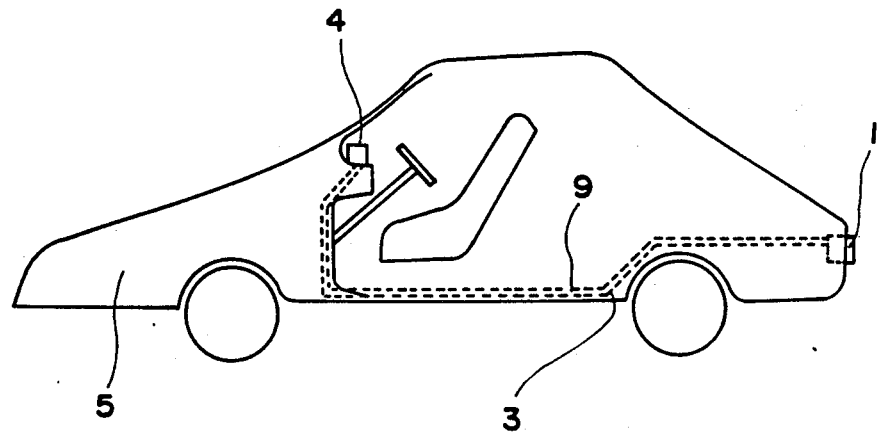
FIG. 8 is a diagrammatic side view of a passenger car fitted with a flexible optical fiber bundle according to this invention.
Figure 9:
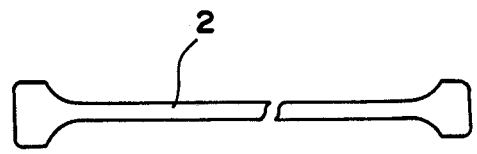
FIG. 9 illustrates a flexible optical fiber, partly broken, the ends of which are like a funnel in shape.

With reference to FIG. 8, a plurality of object lenses 1 are fixed to the rear part of the body of a car 5 in order to leave no dead spaces behind the car. Images received by the object lenses 1 are transmitted respectively through flexible optical fiber bundles 9 to a display 4 where the images are optically formed. In this case, the images so optically formed are inverted ones since flexible optical fiber gatherings of which the bundles 9 are composed are each twisted by 180°. The flexible optical fiber bundles 9 are each protected by a flexible tube 3 and may be set up inside or outside of the body of the car.

Example 7

Eighty (80) of each of three kinds of flexible optical fibers 2 respectively having diameters of 0.125 mmφ, 0.250 mmφ and 0.500 mmφ, are arranged in parallel with one another to form flexible optical fiber gatherings 8 which are then each twisted by 180°. Eighty (80) of the thus twisted gatherings are longitudinally laminated together to obtain three kinds of flexible optical fiber bundles 9. A test is made on each of three kinds of the flexible optical fiber bundles by using a viewing device comprising the optical fiber bundle in identifying an automobile, which is 100 meters rearward of the viewing device, under the conditions that a 35 mm interchangeable lens ($f_o$=50–70 mm) for cameras is used as the object lens at the exposure of F=4 in the daytime and F=at least 2 in the twilight. In the tests, the image observation is effected by viewing the image formed on the open end of the flexible optical fiber bundle 9. From the results obtained, it is seen that in cases where the same lens is used, the smaller the diameter of flexible optical fibers 2 used is, the more distinctly the image is formed although the image is dark due to reduced quantity of light, and that the optimum diameter of the flexible optical fibers 2 is thus in the range of 0.1–0.5 mm.

It is preferable that at least one end, near a display 4, of the flexible optical fibers 2 used in this invention be flare-like, that is funnel-like or trumpet-like, in sectional shape as indicated in FIG. 12 which shows the fiber 2 in magnified form. It is effective to use a flexible optical fiber bundle 9 prepared from such flexible optical fibers having flare-like sectional shape since the use of such fiber bundle 9 enables an enlarged image to be directly viewed without the use of a specific viewing means. Further, it is possible to form a brighter image by using a flexible optical fiber bundle prepared from the fibers 2 having their end near an object lens shaped like flare. Extremely fine flexible optical fibers 2 may be obtained by stretching a suitable material such as a big cylindrical glass or synthetic resin while heating and then cutting an intermediate uniformly thin portion of the thus stretched material. If the stretched material is cut at the portion where the diameter thereof is left a little larger, there will be easily obtained flexible optical fibers 2 the one end of which is flare-like in sectional shape.

The flexible optical fibers 2 used in the formation of the flexible optical fiber bundle 9 according to this invention may be usual ones which are circular in sectional shape, however, it is advantageous in that the optical fibers 2 are polygonal in sectional shape since the use of such optical fibers will render it possible to increase space factors. Particularly, it is effective to use flexible optical fibers having a polygonal section since the space factor for an image forming face on the side of an object lens 1 has a direct effect on the brightness of the corresponding image formed on a display 4. Although a loss of the fibers 2 having a polygonal section increases as an angle made by two adjacent sides of the polygon is more acute, the loss of the fibers 2 themselves will not raise a serious problem in cases where the length of the fibers 2 is in the range of 10–15 m if the material of the fibers is the same. Thus, it is preferred to use the fibers 2 having a trigonal to octagonal section with those having a square, rectangular or hexagonal section being particularly preferred.

Example 8

Figure 10:
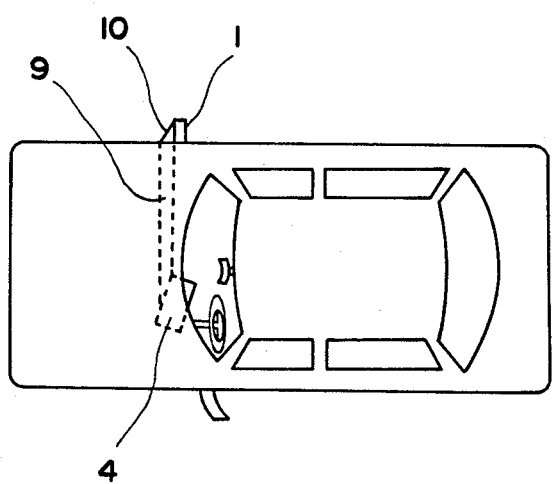
FIG. 10 illustrates a diagrammatic plan view of a car fitted with a viewing device of this invention comprising a flexible optical fiber bundle and a prism.

With reference to FIG. 10, a prism 10 is set up between an object lens 1 and a flexible optical fiber bundle 9. Since the incident light rays may be refracted at a desired angle by the prism 10, the flexible optical fiber bundle may be correspondingly shortened thereby to economize spaces and materials efficiently. In a case where the flexible optical fiber bundle 9 and the prism 10 are used in combination, each of the flexible optical fiber gatherings 8 in the bundle 9 may have been twisted by 180° or any one thereof may not have been twisted at all. In any event, it is necessary to form a 180° inverted image at a display 4. To this end, it is necessary that the kind and number of prisms 10 used be properly adjusted.

In cases where a flexible optical fiber bundle prepared by longitudinally laminating a plurality of 180° twisted flexible optical fiber gatherings together, is used as the image-transmitting medium in a viewing device, an image formed in the display of the viewing device is an inverted (right side-left side inverted) one which is the same as that reflected from a conventional rearview mirror. Thus, such an inverted image will give a driver the same drive feeling as he feels when he drives while viewing an image reflected from the rearview mirror.

Accordingly, the viewing devices using therein a twisted flexible optical fiber bundle according to this invention are preferably used alone or in combination with a rearview mirror and the like as a substitute for a room rearview mirror and side view mirrors.

The viewing devices of this invention are also useful in various physical and chemical fields including endoscopy.

What is claimed is:

1. A twisted flexible optical fiber bundle for use in viewing devices comprising a plurality of flexible optical fibers disposed in parallel with one another to define flexible optical fiber gatherings, each of said flexible optical fiber gatherings being twisted by 180° to define twisted flexible optical fiber gatherings so that a right side-left side inverted image is formed of an object viewed through a viewing device, said twisted optical fiber gatherings being longitudinally laminated together to define the twisted flexible optical fiber bundle.

2. A twisted flexible optical fiber bundle according to claim 1, wherein the fibers have a diameter of 0.1–0.5 mm.

3. A viewing device for observing the right side-left side inverted image of an object which is outside the field of view of an observer, comprising at least one object lens fixed to observe areas outside the field of view of an observer, an image forming unit set up in front of the observer and a flexible optical fiber bundle connected at one end to the at least one object lens and at the other end to the image forming unit, said flexible optical fiber bundle comprising a plurality of flexible optical fibers disposed in parallel with one another to define flexible optical fiber gatherings, each of said flexible optical fiber gatherings being twisted by 180° to to define twisted flexible optical fiber gatherings so that a right side-left side inverted image is formed of an object viewed through a viewing device, said twisted optical fiber gatherings being longitudinally laminated together to define the twisted flexible optical fiber bundle, thereby an image received by the object lens is transmitted through the twisted flexible optical fiber bundle to the image forming unit in which the right side-left side inverted image is formed.

4. A viewing device according to claim 3 wherein said observer is the driver of a transportation vehicle which is an automobile, autobicycle, ship or aircraft.

5. A viewing device according to claim 3 or 4, wherein said image forming unit is a member selected from the group consisting of a display, a convex lens, a concave mirror and the near ends themselves of the twisted flexible optical fiber bundle.

6. A viewing device according to claim 4, wherein said at least one object lens is fixed on the rear portion of the body of the transportation vehicle to provide a view of the scene behind the vehicle.

7. A viewing device according to claim 6, wherein said at least one object lens is fixed on the outside of the body of the transportation vehicle to provide a view of the scenes in lateral and rear of the body of the vehicle.

8. A viewing device according to claim 6, wherein said at least object lens is fixed not only on the rear portion of, but also on the outside of, the body of the vehicle to provide a wide view of the scenes in lateral and rear of the body of the vehicle.

9. A viewing device according to claim 3 wherein the flexible optical fibers have a diameter of 0.1–0.5 mm.

10. A viewing device according to claim 5, wherein the flexible optical fibers have a diameter of 0.1–0.5 mm.

11. A viewing device according to claim 5, wherein a flat mirror or prism is installed in the light path between the object lens and flexible optical fibers or in a light path within the display to effect image inversion.

* * * * *